US011978386B2

(12) United States Patent
Shikata et al.

(10) Patent No.: US 11,978,386 B2

(45) **Date of Patent: *May 7, 2024**

(54) SYSTEM AND METHOD FOR REDUCING ELECTROMAGNETIC INTERFERENCE IN A DISPLAY PANEL

(71) Applicant: Synaptics Incorporated, San Jose, CA (US)

(72) Inventors: Atsushi Shikata, Tokyo (JP); Takashi Uehara, Tokyo (JP); Shigeru Ota, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,187

(22) Filed: Feb. 24, 2023

(65) Prior Publication Data

US 2023/0222958 A1 Jul. 13, 2023

Related U.S. Application Data

(63) Continuation of application No. 17/900,781, filed on Aug. 31, 2022, now Pat. No. 11,615,735.

(60) Provisional application No. 63/240,293, filed on Sep. 2, 2021.

(51) Int. Cl.
*G09G 3/20* (2006.01)

(52) U.S. Cl.
CPC ... *G09G 3/2096* (2013.01); *G09G 2320/0233* (2013.01); *G09G 2320/043* (2013.01); *G09G 2320/046* (2013.01); *G09G 2330/026* (2013.01); *G09G 2330/06* (2013.01)

(58) Field of Classification Search
CPC ......... G09G 3/2096; G09G 2320/0233; G09G 2320/043; G09G 2320/046; G09G 2330/026; G09G 2330/06
See application file for complete search history.

(56) References Cited

U.S. PATENT DOCUMENTS

| | | | | |
|---|---|---|---|---|
| 11,615,735 | B1 * | 3/2023 | Shikata | G09G 3/2096 345/214 |
| 2013/0162304 | A1 | 6/2013 | Kim | |
| 2019/0244556 | A1 * | 8/2019 | Yoon | G09G 3/2096 |
| 2020/0320917 | A1 * | 10/2020 | Han | G09G 5/393 |

(Continued)

*Primary Examiner* — Lixi C Simpson
(74) *Attorney, Agent, or Firm* — Leydig, Voit & Mayer, Ltd.

(57) ABSTRACT

A display system includes a first memory and a display driver. The display system is configured to control the first memory to receive compensation information from the first memory with a first frequency and generate data signals for image data to be displayed on a display panel. The generation of the data signals comprises performing a compensation for the data signals based on the compensation information received from the first memory. The display driver is further configured to update pixels of the display panel with the data signals during an active display state. The display driver is further configured to generate updated compensation information based at least in part on the image data and the compensation information received from the first memory and transmit the updated compensation information to the first memory during the active display state with a second frequency lower than the first frequency.

20 Claims, 6 Drawing Sheets

(56) References Cited

U.S. PATENT DOCUMENTS

| | | | | |
|---|---|---|---|---|
| 2022/0013052 | A1 | 1/2022 | Wang | |
| 2022/0270664 | A1* | 8/2022 | Jeter | G11C 29/021 |

* cited by examiner

SYSTEM AND METHOD FOR REDUCING ELECTROMAGNETIC INTERFERENCE IN A DISPLAY PANEL

CROSS-REFERENCE TO RELATED APPLICATIONS

This application is a continuation of, and thereby claims benefit under 35 U.S.C. § 120 to, U.S. patent application Ser. No. 17/900,781 filed on Aug. 31, 2022, and entitled, "SYSTEM AND METHOD FOR REDUCING ELECTROMAGNETIC INTERFERENCE IN A DISPLAY PANEL," which is incorporated herein by reference in its entirety. U.S. patent application Ser. No. 17/900,781 claims priority under 35 U.S.C. § 119(e) to U.S. Provisional Patent Application Ser. No. 63/240,293, filed on Sep. 2, 2021, and entitled, "SYSTEM AND METHOD FOR REDUCING ELECTROMAGNETIC INTERFERENCE IN A DISPLAY PANEL," which is incorporated herein by reference in its entirety.

FIELD

This disclosure relates generally to the field of display systems, specifically to minimizing impacts of electromagnetic interference (EMI) in display panels.

BACKGROUND

Display systems based on display panels such as organic light emitting diode (OLED) display panels and liquid crystal display (LCD) panels may potentially experience various display artifacts that may cause poor image quality. To reduce display artifacts, a display system may be configured to perform an image compensation or correction in generating data signals with which pixels in the display panel are updated.

One example image compensation technique is deburn compensation (or deburn correction), which compensates or corrects for "burn-in" or long-term burning of overused pixels in the display panel. As known in the art, OLED display panels are susceptible to long-term burning of overused pixels. Deburn compensation may be performed based on aging information prepared for each pixel or for each set of pixels. The aging information may be indicative of the usage of each pixel over time. In one implementation, accumulated luminance of each pixel may be used as the aging information of the pixel.

Another example image compensation technique is demura compensation (also referred to as demura correction), which compensates or corrects for artifacts caused by production variations during display panel manufacturing. When driven with the same input stimulus, one pixel may have very different luminance and chrominance outputs from another pixel in the panel. These manufacturing differences can result in image distortions and generally poor image quality. Demura compensation may be utilized to minimize or correct such image quality issues. Demura compensation may correct for power law differences between pixels due to production variations. The specific luminance and chrominance of pixels may be measured, either in production and assembly, or in the field, and demura correction values may be determined which adjust the luminance and chrominance of individual pixels to achieve a uniform response across the entire display panel.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate to a display system that includes a first memory and a display driver. The display driver is configured to control the first memory to receive compensation information from the first memory with a first frequency. The display driver is further configured to generate data signals for image data to be displayed on a display panel. The generation of the data signals comprises performing a compensation for the data signals based at least in part on the received compensation information from the first memory. The display driver is further configured to update pixels of the display panel with the data signals during an active display state. The active display state referred herein may be a state in which the display driver is operating to update the pixels in the display panel by providing the data signals to the pixels. The display driver is further configured to generate updated compensation information based at least in part on the image data and the compensation information received from the first memory and transmit the updated compensation information to the first memory during the active display state with a second frequency lower than the first frequency.

In general, in one aspect, one or more embodiments relate to a display driver that includes a data interface, drive circuitry, and a controller. The data interface is configured to control a first memory to receive compensation information from the first memory with a first frequency. The drive circuitry is configured to generate data signals for image data to be displayed on a display panel and update pixels of the display panel with the data signals during an active display state. The generation of the data signals includes performing a compensation for the data signals. The controller is configured to control the compensation based at least in part on the compensation information received from the first memory. The controller is further configured to generate updated compensation information based at least in part on the image data and the compensation information received from the first memory. The data interface is further configured to transmit the updated compensation information to the first memory during the active display state with a second frequency lower than the first frequency.

In general, in one aspect, one or more embodiments relates to a method for driving a display panel. The method includes receiving, by a display driver, compensation information from a first memory with a first frequency. The method further includes generating, by the display driver, data signals for image data to be displayed on a display panel. The generation of the data signals includes performing a compensation for the data signals based at least in part on the compensation information received from the first memory. The method further includes updating, by the display driver, pixels of the display panel with the data signals during an active display state and generating, by the display driver, updated compensation information based at least in part on the image data and the compensation information received from the first memory. The method further includes transmitting the updated compensation information from the display driver to the memory during the active display state with a second frequency lower than the first frequency.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1:
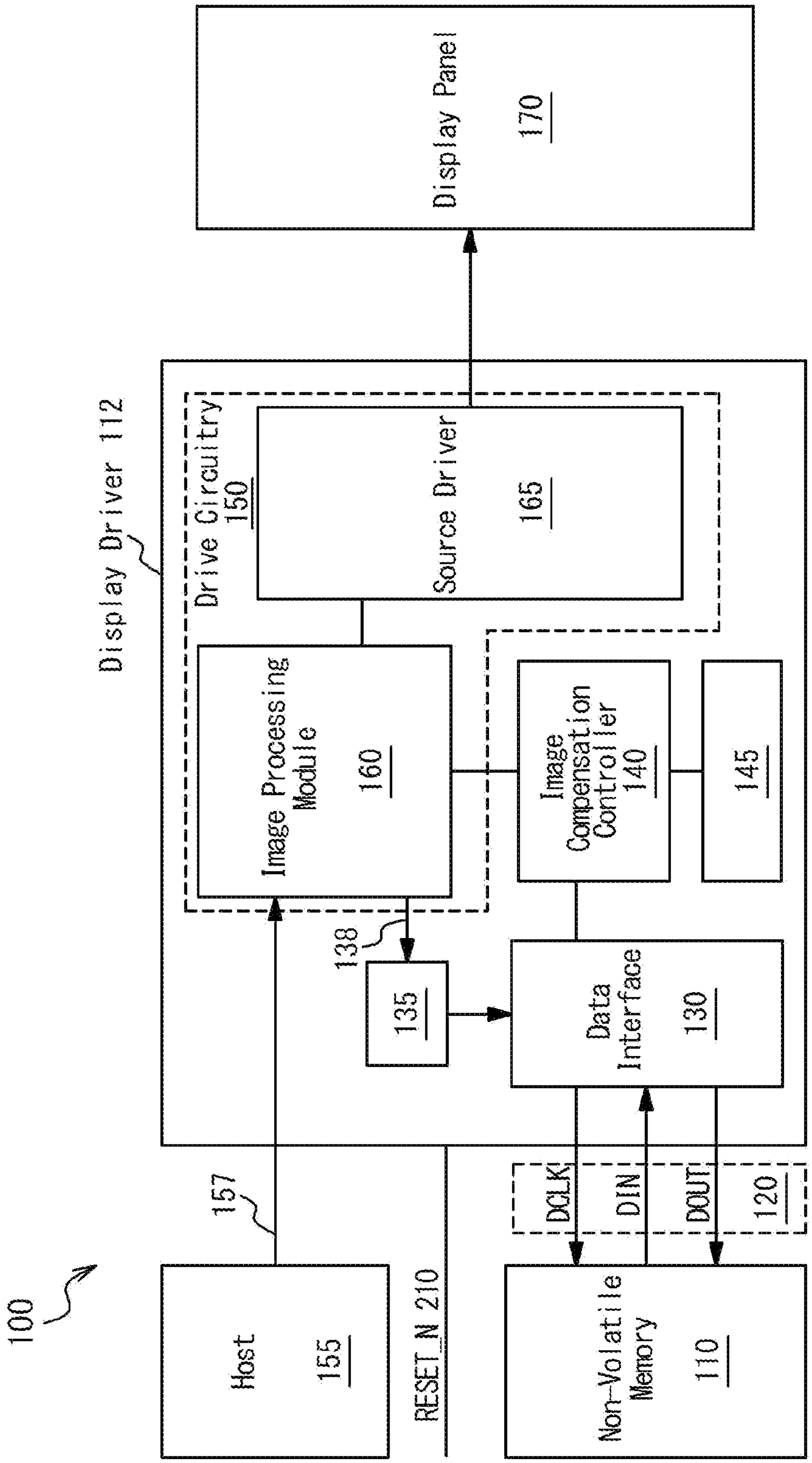
FIG. 1 shows an example configuration of a display system, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

Display systems based on display panels such as organic light emitting diode (OLED) display panels and liquid crystal display (LCD) panels may potentially experience various display artifacts that may cause poor image quality. To reduce display artifacts, a display system may be configured to perform an image compensation or correction in generating data signals with which pixels in the display panel are updated. In one implementation, a display driver may include image processing circuitry configured to process the image data to achieve the image compensation.

A display system adapted to an image compensation may include a memory configured to store compensation information that controls the image compensation. Examples of the compensation information include aging information for deburn compensation and demura correction values for demura compensation. The memory may be external to the display driver. The memory may be a non-volatile memory such as a flash memory. In such implementations, a display driver may be configured to receive the compensation information from the memory and perform the image compensation based on the received compensation information. The display driver may be further configured to update the compensation information stored in the memory depending on circumstances. For example, the display driver may be configured to update the aging information stored in the memory based on the usage of the pixels in the display panel.

As state of the art displays become larger and larger, a large volume of compensation information may be exchanged between the memory and the display driver in relation to the image compensation. The exchange of the large volume of information may require a high-speed data clock to exchange the information in a reasonable time. As one example, a quad serial peripheral interface (QSPI) may utilize a clock of up to 100 MHz. The high-speed data clock may be used to exchange the information in relation to the image compensation while the panel is actively displaying images. This high-speed data clock may run at a high frequency and transmit with a high slew rate to achieve an increased data rate. This high frequency and slew rate may however introduce significant electromagnetic interference (EMI) issues in the display panel, resulting in image interference or discoloration.

Accordingly, there exists a need for a system and method that may exchange information for an image compensation between a memory and a display driver while minimizing EMI.

The present disclosure provides a system and method that may exchange compensation information between a memory and a display driver while minimizing EMI. In one or more embodiments, a display system is configured to transfer compensation information from a memory to a display driver with a first slew rate. The slew rate referred herein is the change of the signal level (e.g., the voltage level and the current level) per unit of time. The transfer of the compensation information may be performed during a power on sequence state. The display driver is further configured to generate updated compensation information and transmit the updated compensation information to the memory with a second slew rate during an active display state in which pixels in display panel are updated. The second slew rate is lower than the first slew rate. The transfer of the updated compensation information with a lower slew rate (e.g., the second slew rate) during the active display stage effectively reduces EMI, mitigating image interference or discoloration in the display panel. Further, the display system may be configured to transfer the compensation information from the memory to the display driver at a first frequency and transmit the updated compensation information from the display driver to the memory with a second frequency during the active display stage, where the second frequency is lower than the first frequency. The transfer of the updated compensation information at a lower frequency (e.g., the second frequency) during the active display stage may further reduce EMI. In the following, a description is given of various embodiments of the present disclosure.

FIG. 1 shows an example configuration of a display system 100, according to one or more embodiments. The display system 100 may include a non-volatile memory (or first memory) 110, a display driver 112, bi-directional data bus 120, and a display panel 170. In some embodiments, the non-volatile memory 110 is external to the display driver 112. In other embodiments, the non-volatile memory 110 and the display driver 112 may be monolithically integrated in the same integrated circuit (IC) chip. The non-volatile memory 110 may be a flash memory, an electrically erasable programmable read-only memory (EEPROM) or a different type of non-volatile memory. The display driver 112 may be configured as a display driver integrated circuit (DDIC). The display panel 170 may be an OLED display panel or a different type of display panel susceptible to long-term burning of overused pixels.

The non-volatile memory 110 is configured to store compensation information and provide the compensation information to the display driver 112. The compensation information controls an image compensation performed by the display driver 112. In one implementation, the display driver 112 is configured to receive the compensation information from the non-volatile memory 110 and perform the image compensation based on the compensation information. As described later in detail, the image compensation performed by the display driver 112 may include a deburn compensation and/or a demura compensation.

In embodiments where the image compensation performed by the display driver 112 includes a deburn compensation, the compensation information stored in the non-volatile memory 110 may include long-term aging information of pixels in the display panel 170. The aging information may be indicative of the usage of the pixels over time. The aging information may be prepared on a pixel-by-pixel basis. In one implementation, accumulated luminance of each pixel may be used as the aging information of the pixel. In other embodiments, the aging information may be based on a subset of pixels. In one implementation, accumulated luminance of a subset of pixels may be used as the aging information of the subset of pixels. The aging information may be prepared based on a statistical analysis. The deburn compensation is achieved based on the aging information such that pixels which have seen heavy use may be corrected to a greater degree than pixels which have seen less use. In this manner, the display panel 170 may correct for long-term burn issues caused by continual display of images in fixed locations, such as channel logos or chryons at least often or semi-permanently displayed in the margins of the display panel 170 when the display is on.

In embodiments where the image compensation performed by the display driver 112 includes a demura compensation, the compensation information stored in the non-volatile memory 110 may include demura correction values that represent variations in chrominance and luminance of pixels in the display panel 170. The non-volatile memory 110 may be configured to store demura correction values for each pixel of the entire display panel 170, or for a subset of pixels.

In some embodiments, the non-volatile memory 110 may be configured to store aging information for the deburn compensation. In other embodiments, the non-volatile memory 110 may store demura correction values for the demura compensation. In other embodiments, the non-volatile memory 110 may store aging information and demura correction values. In other embodiments, the non-volatile memory 110 may optionally store other data which is not aging information or demura correction values.

The non-volatile memory 110 may be further configured to store profile data used to control the display driver 112. The profile data may include register values to be set to registers in the display driver 112 to control the operation of the display driver 112.

The display driver 112 is configured to receive image data 157 from a host 155 and update the display panel 170 based at least in part on the image data 157. The image data 157 may represent pixel data for image display. In one implementation, pixel data for a pixel may include a grey scale level specified for the pixel. In one or more embodiments, the display driver 112 is configured to generate data signals based on the image data 157 and update pixels in the display panel 170 with the generated data signals. The update of the pixels in the display panel 170 may be performed during an active display state. The generation of the data signals includes an image compensation based at least in part on the compensation information stored in the non-volatile memory 110. In one implementation, the display driver 112 is configured to control the non-volatile memory 110 to receive the compensation information from the non-volatile memory 110 via the bi-directional data bus 120 and perform the image compensation based at least in part on the compensation information received from the non-volatile memory 110.

The display driver 112 may be further configured to update the compensation information stored in the non-volatile memory 110 via the bi-directional data bus 120. In one implementation, the display driver 112 may be further configured to generate updated compensation information based at least in part on the image data 157 and the compensation information received from the non-volatile memory 110 and transmit the updated compensation information to the non-volatile memory 110. The compensation information stored in the non-volatile memory 110 may be overwritten with the updated compensation information generated by the display driver 112.

In embodiments where the compensation information stored in the non-volatile memory 110 includes aging information for deburn compensation, the display driver 112 may be configured to update the aging information at least in part on the image data 157. The display driver 112 may be configured to generate updated aging information based at least in part on the image data 157 and the aging information received from the non-volatile memory 110 and transmit the updated aging information to the non-volatile memory 110 via the bi-directional data bus 120. The updated aging information may be generated to indicate updated accumulated luminance of each pixel based on the image data 157 and the accumulated luminance indicated by the aging information stored in the non-volatile memory 110. The aging information stored in the non-volatile memory 110 may be overwritten with the updated aging information generated by the display driver 112.

In the embodiment shown in FIG. 1, the display driver 112 includes a data interface 130, a data interface controller 135, an image compensation controller 140, a memory element (or second memory) 145, and drive circuitry 150. In one implementation, the data interface 130, the data interface controller 135, the image compensation controller 140, and drive circuitry 150 may be monolithically integrated in the same IC chip while the non-volatile memory 110 may be integrated in a different IC chip.

The data interface 130 may be configured to access the compensation information stored in the non-volatile memory 110 over the bi-directional data bus 120. The data interface 130 may be configured to retrieve the compensation information from the non-volatile memory 110 and write the updated compensation information generated by the display driver 112 onto the non-volatile memory 110. Communications over the bi-directional data bus 120 may use a standard protocol, including but not limited to serial peripheral interface (SPI), quad SPI (QSPI), inter-integrated circuit (I2C), universal serial bus (USB) or universal asynchronous receiver/transmitter (UART). The communications over the bi-directional data bus 120 may optionally be over a custom data protocol. In FIG. 1, the bi-directional data bus 120 is shown with a clock line (DCLK), a data input line (DIN) and a data output line (DOUT), but this is merely exemplary of one or more embodiments. It is noted that "DCLK" may also refer to the clock signal transmitted over the clock line DCLK while "DIN" and "DOUT" may also refer to data signals transmitted over the data input line DIN and the data output line DOUT, respectively. Other embodiments of the bi-directional data bus 120 may utilize a different number of clock and data lines. For purposes of the instant disclosure, directions of signals on the bi-directional data bus 120 are defined in reference to the display driver 112, where the data input signal DIN is an input to the display driver 112, and the data output signal DOUT is an output from the display driver 112. The data input signal DIN and the data output signal DOUT may be synchronous with the clock signal DCLK, and accordingly the frequencies of the data input signal DIN and the data output signal DOUT may be equal to the clock frequency, i.e., the frequency of the clock signal DCLK.

The data interface controller 135 may be configured to send signals to the data interface 130 to adjust the clock frequency and slew rate of the clock signal DCLK and to adjust the frequencies and slew rates of the data signals DIN and DOUT.

The image compensation controller 140 is configured to receive the compensation information from the non-volatile memory 110 via the data interface 130 and control an image compensation performed in the drive circuitry 150 based at least in part on the received compensation information. In embodiments where the image compensation includes deburn compensation, the received compensation information includes the aging information for the respective pixels in the display panel 170, and the image compensation controller 140 is configured to control or adjust the deburn compensation based on the aging information. In embodiments where the image compensation includes the demura compensation, the received compensation information includes the demura correction values for the respective pixels in the display panel 170, and the image compensation controller 140 is configured to control or adjust the demura compensation based on the demura correction values. The image compensation controller 140 may be further configured to update the compensation information stored in the non-volatile memory 110 via the data interface 130. In one implementation, the image compensation controller 140 may be configured to generate updated compensation information based on the image data 157 and the compensation information received from the non-volatile memory 110 and provide the updated compensation information to the non-volatile memory 110 via the data interface 130.

In embodiments where the image compensation includes the deburn compensation, the image compensation controller 140 may be further configured to access the memory element 145 to store the aging information for use in later processing. The image compensation controller 140 may be further configured to retrieve the aging information stored earlier. The image compensation controller 140 may be further configured to generate deburn correction values for the pixels in the display panel 170 based on the aging information retrieved from the memory element 145. In one implementation, the deburn correction values are generated such that pixels which have seen heavy use are corrected to a greater degree than pixels which have seen less use. The image compensation controller 140 may be further configured to provide the deburn correction values to the drive circuitry 150 for use for the deburn compensation in the drive circuitry 150.

The image compensation controller 140 may be further configured to monitor lifetime statistics on pixel usage based on the image data 157 and update the aging information stored in the memory element 145 based on the usage of pixels. The updated aging information may form the updated compensation information used to update the compensation information stored in the non-volatile memory 110 or part of the updated compensation information. The image compensation controller 140 may be further configured to transmit the updated aging information to the non-volatile memory 110 via the data interface 130.

In embodiments where the image compensation includes the demura compensation, the image compensation controller 140 may be further configured to access the memory element 145 to store the demura correction values for use in later processing. The image compensation controller 140 may be further configured to retrieve the demura correction values stored earlier and provide the retrieved demura correction values to the drive circuitry 150 for use for the demura compensation.

The drive circuitry 150 is configured to generate data signals based on the image data 157 received from the host 155 and update the pixels in the display panel 170 with the generated data signals. The image data 157 may represent pixel data for image display. In the shown embodiment, the drive circuitry 150 includes an image processing module 160 and a source driver 165.

The image processing module 160 is configured to process the image data 157 and output resulting image data to the source driver 165. The source driver 165 is configured to generate data signals based on the resulting image data received from the image processing module 160 and update the pixels in the display panel 170 with the generated data signals.

The processing performed by the image processing module 160 involves the image compensation under the control of the image compensation controller 140. In embodiments where the image compensation includes the deburn compensation, the image processing module 160 may be configured to receive the deburn correction values for the respective pixels in the display panel 170 from the image compensation controller 140 and apply the deburn correction values to generate the resulting image data for the respective pixels. In embodiments where the image compensation includes the demura compensation, the image processing module 160 may be configured to receive the demura correction values for the respective pixels of the display panel 170 from the image compensation controller 140 and apply the demura correction values to generate the resulting image data for the respective pixels.

In one or more embodiments, the data interface controller 135 may be configured to receive a mode control signal 138 from the image processing module 160 representing the current mode of operation of the display system 100. A first polarity of the mode control signal 138 may indicate the display system 100 is placed in an active display state in which the display system 100 is actively driving the image data 157 onto the display panel 170 through the data signals generated by the source driver 165. A second polarity of the mode control signal 138 may indicate the display system 100 is not placed in the active display state. The second polarity of the mode control signal 138 may indicate the display system 100 is in a power down or sleep mode in which the display system 100 is not actively driving the image data 157 onto the display panel 170 through the data signals generated by the source driver 165.

The data interface controller 135 may include circuitry to adjust the frequencies and slew rates of the clock signal and the data signals transmitted over the bi-directional data bus 120 based on the polarity of the mode control signal 138. The data interface controller 135 may include a switch, multiplexer, logic gate or other circuit element capable to control clock frequencies and slew rates.

The first polarity of the mode control signal 138 may indicate the display system 100 is actively driving the image data 157 onto the display panel 170 through data signals generated by the source driver 165. In one implementation, when the mode control signal 138 is set to the first polarity, the data interface controller 135 may set the clock frequency, i.e., the frequency of the clock signal DCLK to a lower frequency. Additionally or alternatively, the data interface controller 135 may set the slew rates of the clock signal DCLK, the data output signal DOUT, and the data input signal DIN to a lower slew rate when the mode control signal 138 is set to the first polarity. It is noted that the frequencies of the data output signal DOUT and the data input signal DIN are also set to the lower frequency by setting the frequency of the clock signal DCLK to the lower frequency. In this manner, EMI is reduced in the clock signal and the data signals transmitted over the bi-directional data bus 120 and distortion of the image on the display panel 170 is reduced.

The second polarity of the mode control signal 138 may indicate the display system 100 is not actively driving the image data 157 onto the display panel 170 through data signals generated by the source driver 165. In one implementation, when the mode control signal 138 is set to the second polarity, the data interface controller 135 may set the frequency of the clock signal DCLK to a higher frequency. Additionally or alternatively, the data interface controller 135 may set the slew rates of the clock signal DCLK, the data output signal DOUT, and the data input signal DIN to a faster slew rate when the mode control signal 138 is set to the second polarity. In this mode, when the display panel 170 is not actively displaying an image, there is no concern for the impact of interference, so the bi-directional data bus 120 may be operated at the fastest possible rate to transfer information and data in the shortest possible time.

Figure 2:
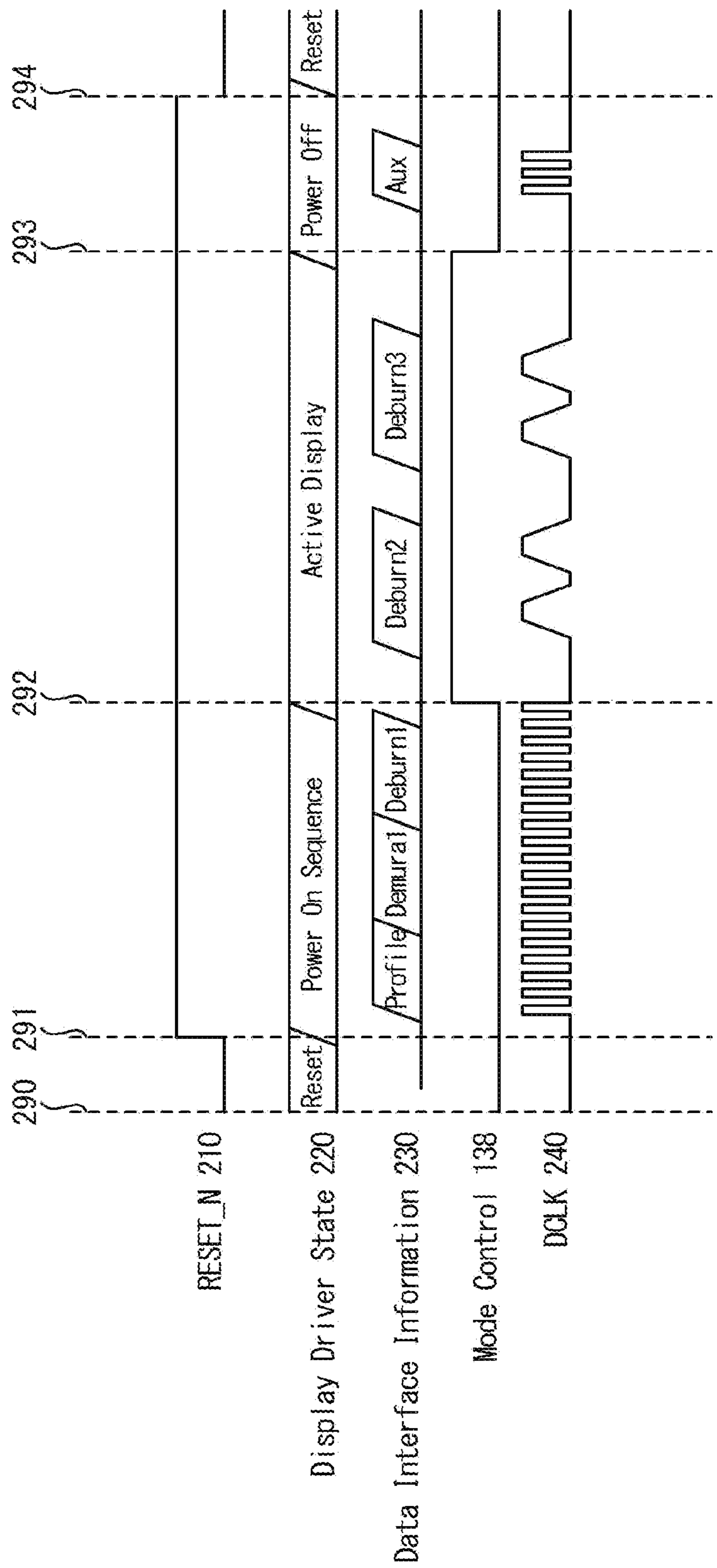
FIG. 2 is a timing diagram of an example operation of the display system, according to one or more embodiments.

FIG. 2 shows a timing diagram of key signals in the operation of the display system 100 in one embodiment. The exact number of signals and the specific signal names shown here are exemplary. Other embodiments may use a different number of signals and/or signals with different names from those shown in FIG. 2.

Signals shown in FIG. 2 include the following: RESET_N 210 (an active low reset signal for the display system 100), display driver state 220 (indicating the operating state of the display system 100), data interface information 230 (indicating the data currently transmitted over the data interface 130 and the bi-directional data bus 120), the mode control signal 138, and the clock signal DCLK 240.

In operation, the display system 100 may be in a reset state, with the RESET_N signal 210 held in the active-low state, as shown at time 290 in FIG. 2. The display driver state 220 is indicated as "Reset", the data interface information 230 is idle, as the data interface 130 is not transmitting or receiving data over bi-directional data bus 120. The mode control signal 138 is held in a low state. The clock signal DCLK 240 is held in a low state. In other embodiments, the mode control signal 138 may be held in a high state, and the clock signal DCLK may be held in a high state.

At time 291, the RESET_N signal 210 may transition to an inactive high state, and the display driver state 220 may transition to a power on sequence state. During the power on sequence state, the data interface information 230 includes profile data, which is indicated by "Profile" in FIG. 2, and compensation information, which is indicated by "Demura1" and "Deburn1". The profile data may include initialization information for startup of the display panel 170. The profile data may include register values to be stored in registers in the display driver 112 to control the operation of the display driver 112. In the shown embodiment, the profile data is first transmitted from the non-volatile memory 110 to the display driver 112 and the compensation information is then transmitted from the non-volatile memory 110 to the display driver 112.

In the shown embodiment, the compensation information includes "Demura1" data and "Deburn1" data. The "Demura1" data includes information for demura compensation to compensate for manufacturing differences in pixel response. In one implementation, the "Demura1" data may include a set of demura correction values for the respective pixels in the display panel 170. The "Deburn1" data includes aging information used for deburn compensation for the respective pixels in the display panel 170. "Demura1" indicates a first set of demura compensation data stored in the non-volatile memory 110. During other power on sequence states when the display system is enabled, different sets of demura compensation data may be transmitted over the bi-directional data bus 120.

During the power on sequence state, the mode control signal 138 is set to an inactive polarity, shown as a low state in FIG. 2. The inactive polarity of the mode control signal 138 causes the data interface controller 135 to set the frequency of the clock signal DCLK 240 to a higher frequency as compared with the lower frequency used during the active display state. The inactive polarity of the mode control signal 138 further causes the data interface controller 135 to set the slew rates of the clock signal DCLK, the data input signal DIN, and the data output signal DOUT to a higher slew rate as compared with the lower slew rate used during the active display state. Accordingly, the compensation information, which may include "Demura1" data and the "Deburn1" data, is transmitted from non-volatile memory 110 to the display driver 112 with the higher slew rate at the higher frequency.

The data interface controller 135 may include a switch, multiplexer, logic gate or other circuit element capable to control clock frequencies and slew rates. The frequency and slew rate of the clock signal DCLK shown in FIG. 2 is for exemplary purposes only. In other embodiments, the frequency of the clock signal DCLK may be higher or lower than the frequencies shown in FIG. 2, and the slew rate of the clock signal DCLK may be higher or lower than the slew rate shown in FIG. 2. The number of clock periods of the clock signal DCLK shown during the power on sequence state in FIG. 2 is merely to indicate that the clock signal is active when data is transmitted over the bi-directional data bus 120 during the power on sequence state. Other embodiments may include more clock periods than the number of clock periods shown in FIG. 2.

At time 292, the power on sequence state completes, and the display driver state 220 transitions to the active display state. During the active display state, the image data 157 is actively driven onto the display panel 170 through data signals generated by the source driver 165. During the active display state, the mode control signal 138 is set to an active polarity, shown as a high state in FIG. 2. The active polarity of the mode control signal 138 may cause the data interface controller 135 to set the frequency of the clock signal DCLK to the lower frequency as compared with the higher frequency used during the power on sequence state. The active polarity of the mode control signal 138 may further cause the data interface controller 135 to set the slew rate of the clock signal DCLK, the data input signal DIN, and the data output signal DOUT to a lower slew rate than the slew rate during the power on sequence state.

The relationship between the frequency of the clock signal DCLK in the power on sequence state and the frequency of the clock signal DCLK in the active display state is shown in FIG. 2 as an example only. While the frequency of the clock signal DCLK during the active display state is slower than the frequency of the clock signal DCLK during the power on sequence state, other embodiments of the display system may include a frequency of the clock signal DCLK during the active display state which, relative to the frequency of the clock signal DCLK during the power on sequence state, is faster or slower than the specific relationship shown in FIG. 2.

During the active display state, the image compensation controller 140 may generate updated compensation information and transmit the updated compensation information to the non-volatile memory 110 over the data output signal DOUT via the data interface 130. In embodiments where the compensation information includes aging information used for the deburn compensation, for example, the image compensation controller 140 may generate and write updated aging information onto the memory element 145 based upon usage of pixels in the display panel 170. As the aging information is updated in the memory element 145, the updated aging information may be written to the non-volatile memory 110 so that the latest aging information is stored in a non-volatile memory space. The updated aging information may be transmitted from the memory element 145 of the display driver 112, over the bi-directional data bus 120, to the non-volatile memory 110. The updated aging information is shown in FIG. 2 as "Deburn2" and "Deburn3" data in the data interface information 230. The updated aging information is transmitted to the non-volatile memory 110 over the data output signal DOUT which is of the lower slew rate and the lower frequency. Accordingly, the updated aging information is transmitted to the non-volatile memory 110 with the lower slew rate at the lower frequency. During a subsequent power on sequence state, the updated aging information is retrieved from the non-volatile memory 110 so that the latest aging information is in use.

The updated compensation information may not be continually transmitted over the bi-directional data bus 120. For example, as shown in FIG. 2, updated aging information "Deburn2" and "Deburn3" may be intermittently transmitted over the bi-directional data bus 120, as indicated by the gaps in the data interface information 230. In operation, the aging information stored in the memory element 145 is updated and the updated aging information is transmitted to the non-volatile memory 110 over the bi-directional data bus 120. Over time, multiple sets of updating aging information may be transmitted during the active display state. In one or more embodiments, a display system 100 which is enabled for a long period of time without interruption may transmit multiple sets of the update aging information to the non-volatile memory 110 as the display panel 170 continues to be enabled for image display for a long duration. In this manner, the display driver 112 may store updated aging information which may be retrieved from the non-volatile memory 110 on later power on sequence states. The example of FIG. 2 shows two sets of updated aging information, labelled "Deburn2" and "Deburn3", but other embodiments of the display system may utilize more or fewer sets of updated aging information than the number indicated in FIG. 2.

At time 293, the display system 100 is powered off and the display driver state 220 enters the power off state. During the power off state, the frequency of the clock signal DCLK is set to a high frequency as compared with the low frequency used during the active display state. Additionally, the slew rate of the clock signal DCLK, the data input signal DIN, and the data output signal DOUT may be set to a higher slew rate during the power off state. The data interface information 230 may transmit any auxiliary information that needs to be stored in the display driver 112 prior to reset of the display system 100. This information is indicated as "Aux" in FIG. 2. This auxiliary information may include demura correction values, aging information for demura compensation, or may include other operational information of the display system 100. In some embodiments, auxiliary information may include the latest aging information to be stored in the memory element 145.

At time 294, the RESET_N signal 210 is set to the active low state and the display system 100 returns to the reset state.

Figure 3:
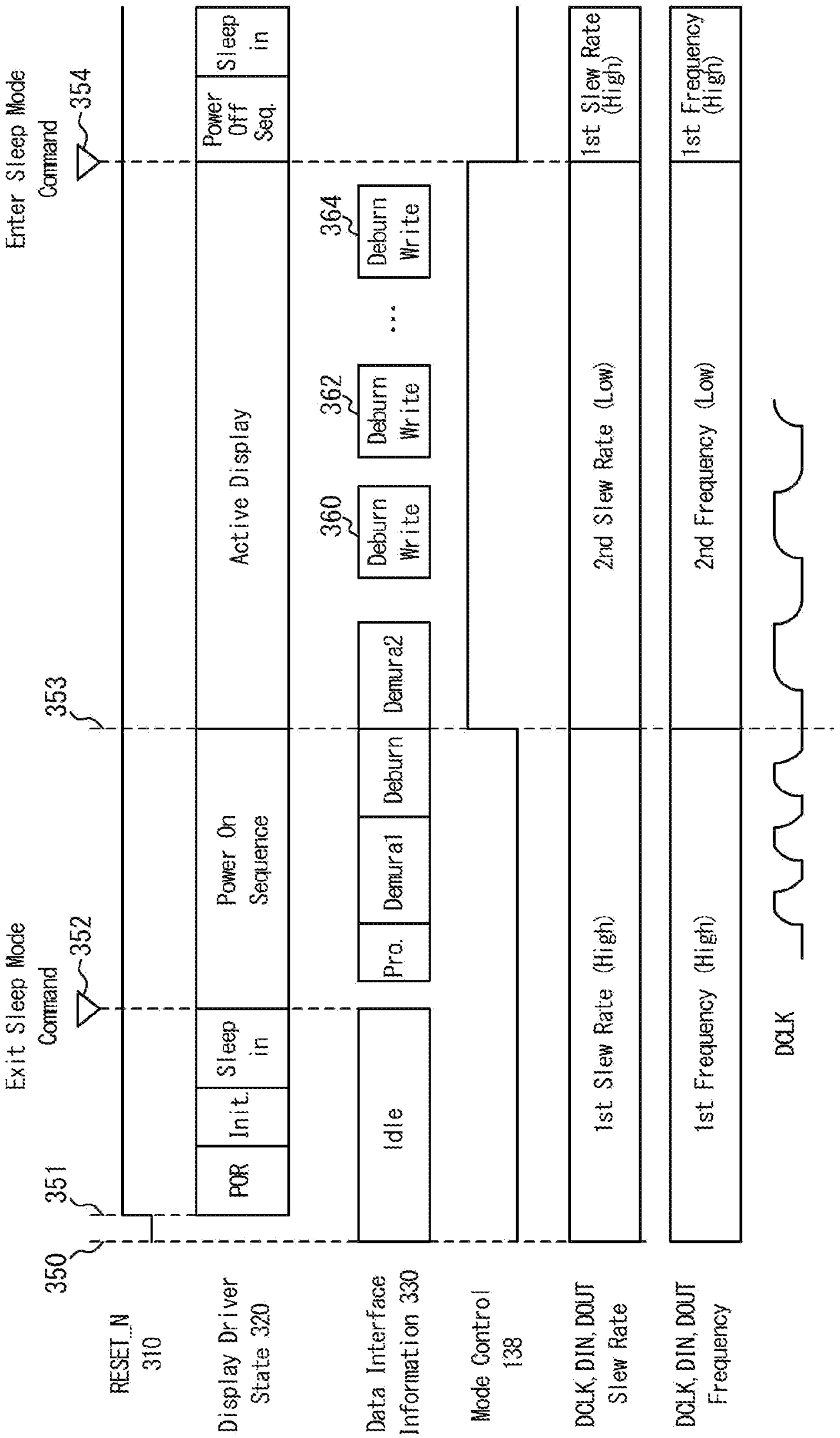
FIG. 3 is a timing diagram of an example operation of the display system, according to other embodiments.

FIG. 3 is a timing diagram showing an example operation of the display system 100 in another embodiment. The exact number of signals and the specific signal names shown here are exemplary. Other embodiments may use a different number of signals and/or signals with different names from those shown in FIG. 3. Signals shown in FIG. 3 include the following: a RESET_N signal 310 (a reset signal for the display system 100), display driver state 320 (indicating the operating state of the display system 100), data interface information 330 (indicating the data currently transmitted over the data interface 130 and the bi-directional data bus 120), the mode control signal 138, and the clock signal DCLK.

In the shown embodiment, the RESET_N signal 310 is initially held in the active-low state at time 350. The data interface information 330 is idle, as the data interface 130 is not transmitting or receiving data over the bi-directional data bus 120. The mode control signal 138 is held in a low state. The clock signal DCLK is held in a low state. In other embodiments, the mode control signal 138 may be held in a high state, and the clock signal DCLK may be held in a high state.

At time 351, the RESET_N signal 310 may transition to an inactive high state, and the display driver state 320 may transition to a power on reset (POR) state during which a POR sequence is performed in the display driver 112. The display driver state 320 may then transition to an initialization state during which the display driver 112 is initialized.

The display driver state 320 may then transition to a sleep in state to reduce the power consumption.

At time 352, the host 155 may send an exit sleep mode command to the display driver 112. The display driver state 320 may transition to a power on sequence state in response to reception of the exit sleep mode command.

During the power on sequence state, the mode control signal 138 is set to an inactive polarity, shown as a low state in FIG. 3. The inactive polarity of the mode control signal 138 may cause the data interface controller 135 to set the frequency of the clock signal DCLK 240 to a first frequency (labelled "High" in FIG. 3) and set the slew rate of the clock signal DCLK 240 to a first slew rate (labelled "High"). The first frequency used during the power on sequence state is higher than a second frequency (labelled "Low") used during the active display state, and the first slew rate used during the power on sequence state is higher than a second slew rate (labelled "Low") used during the active display state. Additionally, the inactive polarity of the mode control signal 138 may cause the data interface controller 135 to set the frequency of the data input signal DIN and the data output signal DOUT to the first frequency and set the slew rate of the data input signal DIN and the data output signal DOUT to the first slew rate.

During the power on sequence state, profile data, which is labelled "Pro." in FIG. 3, is transmitted from the non-volatile memory 110 to display driver 112 over the data input signal DIN. The profile data may include register values to be stored in registers in the display driver 112 to control the operation of the display driver 112. Since the data input signal DIN is of the first slew rate and the first frequency, the profile data is transmitted to the display driver 112 with the first slew rate at the first frequency.

After the transmission of the profile data, compensation information, which is indicated by "Demura1" and "Deburn" in FIG. 3, is transmitted from the non-volatile memory 110 to display driver 112 over the data input signal DIN. In the shown embodiment, the compensation information includes "Demura1" data and "Deburn" data. The "Demura1" data includes information for demura compensation to compensate for manufacturing differences in pixel response. In one implementation, the "Demura1" data may include a set of demura correction values for the respective pixels in the display panel 170. The demura correction values transmitted to the display driver 112 in the form of the "Demura1" data may be stored in the memory element 145 of the display driver 112. The "Deburn" data includes aging information used for deburn compensation for the respective pixels in the display panel 170. As described above, the aging information may be indicative of the usage of each pixel over time. The aging information may include accumulated luminance of each pixel in the display panel 170.

At time 353, the power on sequence state completes, and the display driver state 320 transitions to the active display state. During the active display state, the image data 157 is actively driven onto the display panel 170 through data signals generated by the source driver 165. During the active display state, the mode control signal 138 is set to an active polarity, shown as a high state in FIG. 3. The active polarity of the mode control signal 138 may cause the data interface controller 135 to set the frequency of the clock signal DCLK to the second frequency (labelled "Low" in FIG. 3) and set the slew rate of the clock signal DCLK 240 to the second slew rate (labelled "Low"). Additionally, the active polarity of the mode control signal 138 may cause the data interface controller 135 to set the frequency of the data input signal DIN and the data output signal DOUT to the second frequency and set the slew rate of the data input signal DIN and the data output signal DOUT to the second slew rate. The use of the second frequency and the second slew rate during the active display state, which are respectively lower than the first frequency and the first slew rate used during the power active display state, may reduce EMI caused by the data transmission during the active display state, effectively improving the image quality of the display panel 170.

In the shown embodiment, "Demura2" data is first transmitted from the non-volatile memory 110 to the display driver 112 over the data input signal DIN during the active display state. Since the data input signal DIN is of the second frequency and the second slew rate, the "Demura2" data is transmitted from the non-volatile memory 110 to the display driver 112 with the second slew rate at the second frequency.

The "Demura2" data may be auxiliary demura compensation data used to adjust the demura compensation performed by the display driver 112. The "Demura2" data may include secondary demura correction values applied to the respective pixels in the display panel 170 in the demura compensation performed by the display driver 112. The "Demura2" data may be stored in the non-volatile memory 110 and transmitted from the non-volatile memory 110 to the display driver 112. The image compensation controller 140 in the display driver 112 may be configured to adjust the demura compensation for the respective pixels in the display panel 170 based on the secondary demura correction values contained in the "Demura2" data.

After the transmission of the "Demura2" data, "Deburn Write" data 360, 362, and 364 are transmitted from the display driver 112 to the non-volatile memory 110 over the data output signal DOUT. Since the data output signal DOUT is of the second frequency and the second slew rate, the "Deburn Write" data 360, 362, and 364 are transmitted from the non-volatile memory 110 to the display driver 112 with the second slew rate at the second frequency.

The "Deburn Write" data 360, 362, and 364 include the updated aging information generated by the image compensation controller 140 of the display driver 112. In one implementation, the "Deburn Write" data 360 may include a first piece of the updated aging information, the "Deburn Write" data 362 may include a second piece of the updated aging information, and the "Deburn Write" data 364 may include a third piece of the updated aging information. The first piece of the updated aging information may correspond to a first set of pixels selected from the pixels the display panel 170, the second piece of the updated aging information may correspond to a second set of pixels selected from the pixels of the display panel 170, and the third piece of the updated aging information may correspond to a third set of pixels selected from the pixels of the display panel 170. The "Deburn Write" data 360, 362, and 364 may collectively form a complete set of the updated aging information for all the pixels in the display panel 170.

In the shown embodiment, the "Deburn Write" data 360, 362, and 364 are intermittently transmitted to the display driver 112 as indicated by the gaps in the data interface information 330. The "Deburn Write" data 360 may be first transmitted to the display driver 112, and the "Deburn Write" data 362 may be then transmitted to the display driver 112 after an interval period that follows the transmission of the "Deburn Write" data 360. The "Deburn Write" data 364 may be then transmitted to the display driver 112 after an interval period that follows the transmission of the "Deburn Write" data 362. In this manner, the complete set of the updated aging information may be divisionally transmitted from the display driver 112 to the non-volatile memory 110.

The divisional transmission of the updated aging information may relax data rate restrictions of the data transmission between the display driver 112 and the non-volatile memory 110, facilitating the reduction in the slew rate and/or frequency during the active display state. Although three "Deburn Write" data are shown in FIG. 3, in other embodiments, four or more "Deburn Write" data may collectively form a complete set of the updated aging information for the pixels in the display panel 170.

At time 354, the host 155 may send an enter sleep mode commend to the display driver 112. The display driver state 320 may transition to a power off sequence state in response to reception of the enter sleep mode commend. The display driver 112 may be configured perform a power off sequence during the power off sequence state. The display driver state 320 may then transition to a sleep in state to reduce the power consumption.

Figure 4:
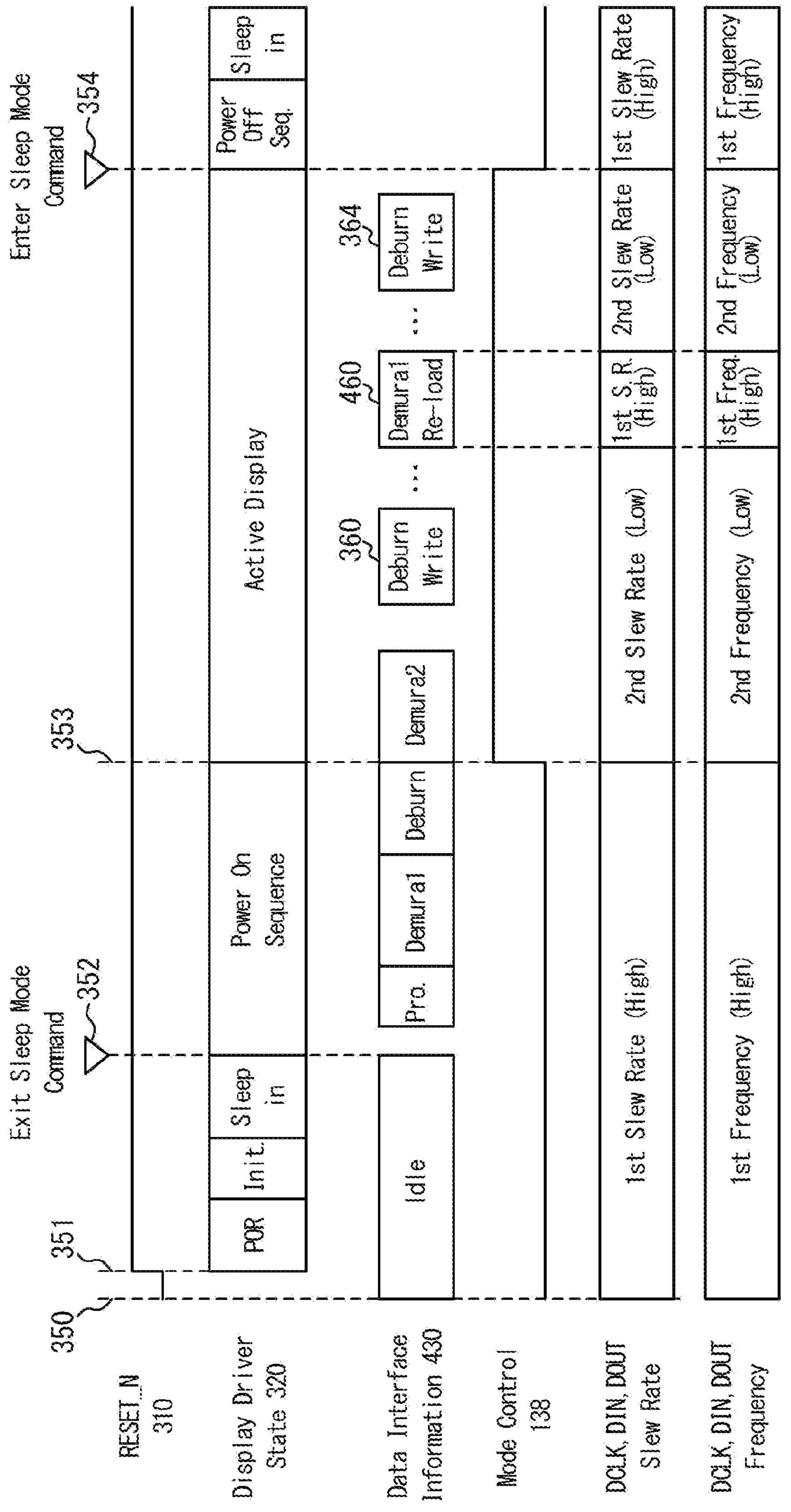
FIG. 4 is a timing diagram of an example operation of the display system, according to still other embodiments.

FIG. 4 is a timing diagram showing an example operation of the display system 100 in still another embodiment. In the shown embodiment, the "Demura1" data, which includes demura correction values for the respective pixels in the display panel 170, is re-loaded or re-transmitted from the non-volatile memory 110 to the display driver 112 during the active display state. The re-loaded "Demura1" data is indicated by "Demura1 Re-load" data 460 in FIG. 4.

In one or more embodiments, the re-loading or re-transmitting of the "Demura1" data may be based on detection of a data error in the demura correction values stored in the memory element 145. The detection of the data error may be based on any suitable error detection technologies, such as cyclic redundancy coding (CRC), error detection coding, and a checksum algorithm. In one implementation, the image compensation controller 140 may be configured to detect a data error in the demura correction values stored in the memory element 145. The image compensation controller 140 may be further configured to notify the data interface 130 of the occurrence of the data error to request for re-transmission of the "Demura1" data, and the data interface 130 may be configured to control the non-volatile memory 110 to re-transmit the "Demura1" data from the non-volatile memory 110 to the display driver 112 over the bi-directional data bus 120 in response to the notification.

In the shown embodiment, the "Demura1" data is re-transmitted from the non-volatile memory 110 to the display driver 112 with the first slew rate (which is higher than the second slew rate) at the first frequency (which is higher than the second frequency) to promptly recover the demura correction values in the memory element 145. The corruption of the demura correction values in the memory element 145 may cause a severe image artifact on the display panel 170. The prompt recovery of the demura correction values effectively mitigates the image artifact caused by the corruption of the demura correction values in the memory element 145. In one implementation, the image compensation controller 140 may be configured to notify the data interface controller 135 of the occurrence of the data error, and the data interface controller 135 may be configured to set the frequencies of the clock signal DCLK and the data input signal DIN to the first frequency and set the slew rates of the clock signal DCLK and the data input signal DIN to the first slew rate during the re-transmission of the "Demura1" data.

Figure 5:
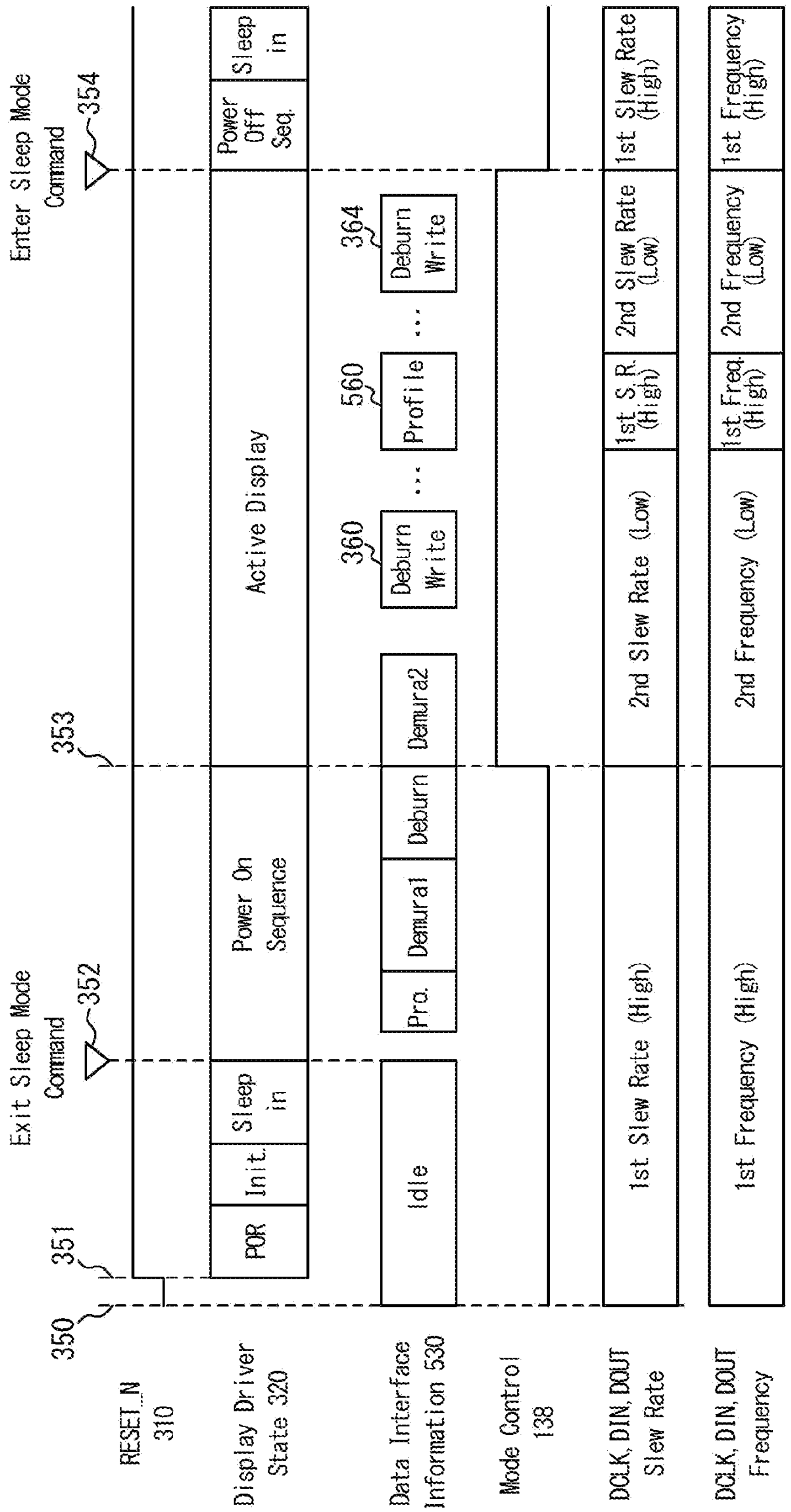
FIG. 5 is a timing diagram of an example operation of the display system, according to still other embodiments.

FIG. 5 is a timing diagram showing an example operation of the display system 100 in still another embodiment. In the shown embodiment, the profile data, which is indicated by numeral 560, is re-loaded or re-transmitted from the non-volatile memory 110 to the display driver 112 during the active display state. As described above, the profile data, which is transmitted during the power on sequence state to control the display driver 112, may include register values to be set to registers in the display driver 112 to control the operation of the display driver 112. In one or more embodiments, the re-loading or re-transmitting of the profile data may be based on detection of a data error in the profile data stored in the display driver 112 (e.g., in the registers in the display driver 112). The detection of the data error may be based on any suitable error detection technologies, such as cyclic redundancy coding (CRC), error detection coding, and a checksum algorithm. In one implementation, the data interface 130 may be configured to control the non-volatile memory 110 to re-transmit the profile data to the display driver 112 over the bi-directional data bus 120 in response to detection of a data error in the profile data stored in the display driver 112.

In the shown embodiment, the profile data is re-transmitted from the non-volatile memory 110 to the display driver 112 with the first slew rate (which is higher than the second slew rate) at the first frequency (which is higher than the second frequency) to promptly recover the profile data in the display driver 112. The corruption of the profile data may cause severe malfunction of the display driver 112. The prompt recovery of the profile data may avoid severe malfunction potentially caused by the corruption of the profile data. In one implementation, the data interface controller 135 may be configured to set the frequencies of the clock signal DCLK and the data input signal DIN to the first frequency and set the slew rates of the clock signal DCLK and the data input signal DIN to the first slew rate during the re-transmission of the profile data over the data input signal DIN.

Figure 6:
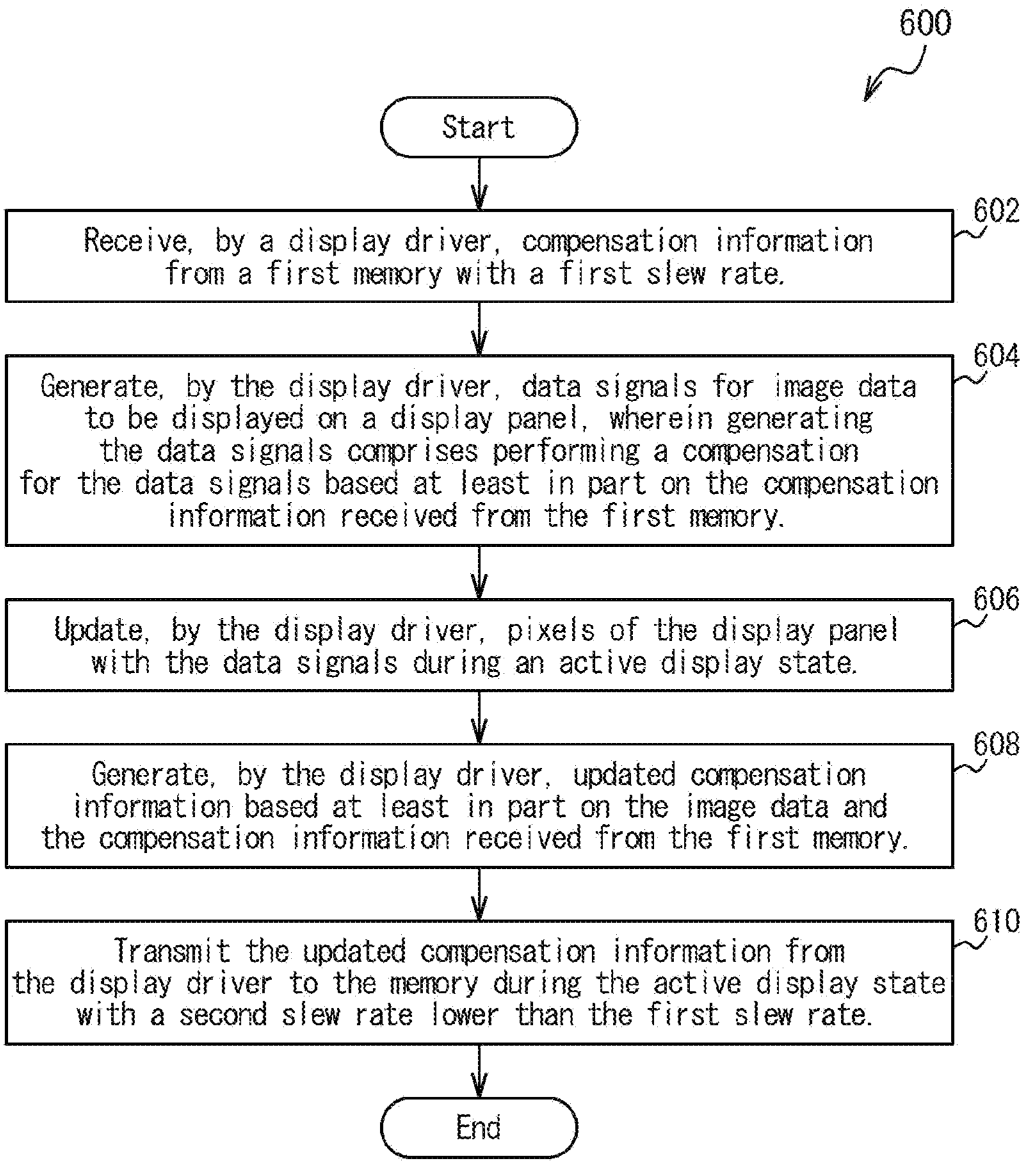
FIG. 6 is a flowchart showing an example method for driving a display panel, according to one or more embodiments.

FIG. 6 shows a flowchart depicting an example method 600, according to one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 6.

The method 600 includes receiving, by a display driver (e.g., the display driver 112 shown in FIG. 1), compensation information from a first memory (e.g., the non-volatile memory 110) with a first slew rate at step 602. The method 600 further includes generating, by the display driver, data signals for image data to be displayed on a display panel (e.g., the display panel 170 in FIG. 1) at step 604. The generation of the data signals includes performing a compensation for the data signals based at least in part on the received compensation information received from the first memory.

The method 600 further includes updating, by the display driver, pixels of the display panel with the data signals during an active display state at step 606. The method 600 further includes generating, by the display driver, updated compensation information based at least in part on the image data and the compensation information received from the first memory at step 608. The method 600 further includes transmitting the updated compensation information from the display driver to the memory during the active display state with a second slew rate lower than the first slew rate at step 610.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display system, comprising:
a first memory; and
a display driver to:
control the first memory to receive compensation information from the first memory at a first frequency,
generate data signals for image data to be displayed on a display panel, wherein generating the data signals comprises performing a compensation for the data signals based at least in part on the compensation information received from the first memory,
update pixels of the display panel with the data signals during an active display state,
generate updated compensation information based at least in part on the image data and the compensation information received from the first memory, and
transmit the updated compensation information to the first memory during the active display state at a second frequency lower than the first frequency.

2. The display system of claim 1, wherein the display driver is further to:
transition between a plurality of modes based at least in part on the active display state of the display panel.

3. The display system of claim 1, wherein the display driver is further to:
transition to a first mode based at least in part on the display system not being in the active display state, wherein controlling the first memory to receive the compensation information at the first frequency is based at least in part on the first mode, and
transition to a second mode based at least in part on the display system being in the active display state, wherein controlling the first memory to receive the compensation information at the second frequency is based at least in part on the second mode.

4. The display system of claim 3, wherein the display driver is further to:
adjust a clock signal frequency based on a current mode selected from the first mode and the second mode.

5. The display system of claim 1, wherein transmitting the updated compensation information to the first memory comprises intermittently transmitting the updated compensation information to the first memory.

6. The display system of claim 1, wherein the display driver receives the compensation information from the first memory during a power on sequence before the display driver is placed into the active display state.

7. The display system of claim 1, wherein the compensation information received from the first memory comprises aging information of the pixels of the display panel, and
wherein performing the compensation for the data signals comprises performing a deburn compensation for the data signals based at least in part on the aging information.

8. The display system of claim 7, wherein generating the updated compensation information comprises updating the aging information based at least in part on the image data.

9. The display system of claim 7, wherein the aging information of the received compensation information comprises accumulated luminance individually of the pixels.

10. The display system of claim 1, wherein transmitting the updated compensation information to the first memory comprises:
transmitting a first piece of the updated compensation information to the first memory, the first piece corresponding to a first set of pixels of the pixels of the display panel; and
after an interval period that follows the transmission of the first piece of the updated compensation information, transmitting a second piece of the updated compensation information to the first memory, the second piece corresponding to a second set of pixels of the pixels of the display panel, the second set of pixels being different than the first set of pixels.

11. The display system of claim 1, wherein the compensation information received from the first memory comprises demura correction values for the pixels of the display panel, and wherein performing the compensation for the data signals comprises performing a demura compensation for the data signals based at least in part on the demura correction values.

12. The display system of claim 11, wherein the display driver comprises a second memory, and wherein the display driver:
stores the demura correction values in the second memory, and
in response to detection of a data error in the demura correction values stored in the second memory during the active display state, controls the first memory to receive the demura correction values from the first memory during the active display state with the first frequency.

13. A display driver, comprising:
a data interface configured to receive compensation information from a memory with a first frequency;
drive circuitry configured to:
generate data signals for image data to be displayed on a display panel, wherein generating the data signals comprises performing a compensation for the data signals, and
update pixels of the display panel with the data signals during a first mode; and
a controller configured to:
control the compensation based at least in part on the compensation information received from the memory, and
generate updated compensation information based at least in part on the image data and the compensation information received from the memory,
wherein the data interface transmits the updated compensation information to the memory during the first mode with a second frequency lower than the first frequency.

14. The display driver of claim 13, wherein the controller is further configured to:
receive a mode control signal from the drive circuitry, and
adjust frequency of a clock signal based at least in part on the mode control signal.

15. The display driver of claim 13, wherein transmitting the updated compensation information to the memory comprises intermittently transmitting the updated compensation information to the memory.

16. The display driver of claim 13, wherein the data interface receives the compensation information from the memory during a power on sequence.

17. The display driver of claim 13, wherein the compensation information received from the memory comprises aging information of the pixels of the display panel, and wherein performing the compensation for the data signals comprises performing a deburn compensation for the data signals based at least in part on the aging information.

18. A method, comprising:

receiving, by a display driver, compensation information from a memory with a first frequency;

generating, by the display driver, data signals for image data to be displayed on a display panel, wherein generating the data signals comprises performing a compensation for the data signals based at least in part on the compensation information received from the memory;

updating, by the display driver, pixels of the display panel with the data signals during an active display state;

generating, by the display driver, updated compensation information based at least in part on the image data and the compensation information received from the memory; and transmitting the updated compensation information from the display driver to the memory during the active display state with a second frequency lower than the first frequency.

19. The method of claim 18, further comprising:

transitioning between a plurality of modes based at least in part on the active display state of the display panel.

20. The method of claim 18, further comprising:

transitioning to a first mode based at least in part on that the display panel not being in the active display state, wherein controlling the first memory to receive the compensation information at the first frequency is based at least in part on the first mode, and transitioning to a second mode based at least in part on that the display panel being in the active display state, wherein controlling the first memory to receive the compensation information at the second frequency is based at least in part on the second mode.

* * * * *